United States Patent
Miller

(10) Patent No.: US 11,486,610 B2
(45) Date of Patent: Nov. 1, 2022

(54) INJECTION NOZZLE AND APPARATUS AND METHODS REGARDING SAME

(71) Applicant: Messer Industries USA, Inc., Bridgewater, NJ (US)

(72) Inventor: Weston L. Miller, Boyertown, PA (US)

(73) Assignee: Messer Industries USA, Inc., New Castle, DE (US)

( * ) Notice: Subject to any disclaimer, the term of this patent is extended or adjusted under 35 U.S.C. 154(b) by 234 days.

(21) Appl. No.: 16/788,690

(22) Filed: Feb. 12, 2020

(65) Prior Publication Data

US 2021/0247110 A1    Aug. 12, 2021

(51) Int. Cl.
*F25B 19/00* (2006.01)
*A23L 3/375* (2006.01)

(52) U.S. Cl.
CPC ............ *F25B 19/005* (2013.01); *A23L 3/375* (2013.01); *A23V 2002/00* (2013.01)

(58) Field of Classification Search
CPC ........ F25B 19/005; F25B 41/20; A23L 3/375; A23V 2002/00
See application file for complete search history.

(56) References Cited

U.S. PATENT DOCUMENTS

| 7,025,096 | B2 | 4/2006 | Garnreiter et al. |
| 7,152,844 | B2 * | 12/2006 | Berghoff .................. F16K 1/38 137/240 |
| 7,156,364 | B2 | 1/2007 | Berghoff |
| 2002/0070287 | A1 * | 6/2002 | Jameson .............. F02M 57/023 239/102.1 |
| 2012/0145279 | A1 | 6/2012 | Shamoun et al. |
| 2015/0047673 | A1 * | 2/2015 | White ..................... B24C 1/003 134/17 |
| 2015/0115055 | A1 * | 4/2015 | Wager ................ F02M 51/0632 239/584 |
| 2016/0078733 | A1 * | 3/2016 | Cerrano ................. A62C 37/00 340/8.1 |
| 2020/0120945 | A1 | 4/2020 | Shamoun et al. |

* cited by examiner

*Primary Examiner* — Emmanuel E Duke
(74) *Attorney, Agent, or Firm* — Joshua L. Cohen

(57) ABSTRACT

An injection nozzle for injecting a substance, such as a cryogenic gas or cryogenic liquid, into the interior of a process vessel, or directly into material inside a process vessel, and includes a housing having a first internal chamber for receiving a fluid, and a second internal chamber having an actuator located therein, a valve body having an outlet, a stem positioned within the first internal chamber of the housing and having opposed proximal and distal ends, wherein the stem is reciprocally movable along its longitudinal axis in the housing to open and close the valve body outlet, and a sensor configured to receive a signal from the actuator.

15 Claims, 3 Drawing Sheets

INJECTION NOZZLE AND APPARATUS AND METHODS REGARDING SAME

TECHNICAL FIELD

The present disclosure relates to an injection nozzle and apparatus and methods regarding same. The present disclosure more particularly relates to an injection nozzle for cryogenic cooling apparatus.

BACKGROUND

It is known to use nozzles to inject substances, such as a liquid or gas, into a wide variety of materials and products, or into processing vessels containing same, especially in the food and beverage industry. Such nozzles are usually mounted on an exterior wall of a processing or treatment vessel and inject substances inside the vessel.

Nozzles may be used to inject cryogenic substances, such as for example liquid nitrogen, into a processing vessel, such as a blender, for food products in order to chill same for subsequent processing. Such a process is referred to as bottom injection (BI), and the nozzles which inject the cryogenic substance are frequently referred to as bottom injection nozzles (BINs). BINs are typically mounted at an exterior wall of the blender and are in fluid communication with the interior of the blender such that the cryogenic substance can be injected through the BIN and into the blender, and optionally directly into the food being processed in the blender.

Known injection nozzles and cryogenic cooling apparatus including the same do not have a mechanism to determine whether a nozzle outlet is in an open or closed position before, during and after an injection cycle. There may be malfunctions in which one or more nozzle outlets remain open, even though the cryogenic cooling apparatus has been shut down or turned off. Such a malfunction causes significant economic losses and may result in serious health and safety issues. Careful attention to whether a nozzle outlet is in an open or closed position before, during and after injection cycles is extremely important.

What is therefore needed is an injection nozzle and apparatuses and methods regarding same which provide an accurate and reliable indication of nozzle outlet closure and safety feedback.

SUMMARY

According to certain illustrative embodiments, disclosed is an injection nozzle comprising a housing having a first internal chamber for receiving a fluid and a second internal chamber having an actuator located therein; a valve body having an outlet; a stem within the first internal chamber of the housing and having opposite proximal and distal ends, wherein the stem is reciprocally movable along the longitudinal axis of the housing to open and close the valve body outlet; and a sensor configured to receive a signal from the actuator. By "configured" as used herein, it is also meant that the element is "constructed and arranged."

According to further illustrative embodiments, also disclosed is an apparatus for delivering cryogen comprising: a source of cryogen; a manifold; a conduit connecting the source of cryogen to the manifold; a plurality of injection nozzles in fluid communication with the manifold; a cryogenic process vessel in fluid communication with the plurality of injection nozzles; and signal processing circuitry; wherein each of the plurality of injection nozzles comprise a housing having a first internal chamber for receiving a gas and/or a liquid and a second internal chamber having an actuator located therein; a valve body having an outlet; a stem positioned within the first internal chamber of the housing and having opposite proximal and distal ends, wherein the stem is reciprocally movable along its longitudinal axis of the housing to open and close the valve body outlet; and a sensor configured to receive a signal from the actuator, wherein the sensor is configured to transmit a signal corresponding to an open or closed position of the valve body outlet of each of the plurality of injection nozzles directly to an indicator member and/or to the signal processing circuitry which transmits a signal to an indicator member.

BRIEF DESCRIPTION OF DRAWINGS

The accompanying illustrative drawings are included to provide a further understanding of the injection nozzle and related apparatuses and methods disclosed herein, and are incorporated in and constitute a part of this specification. The drawings illustrate certain embodiments of the injection nozzle and related apparatuses and methods disclosed herein and, together with the description, serve to explain the principles described herein, but are not intended to limit the specification or any of the claims in any manner.

DETAILED DESCRIPTION

Figure 1:
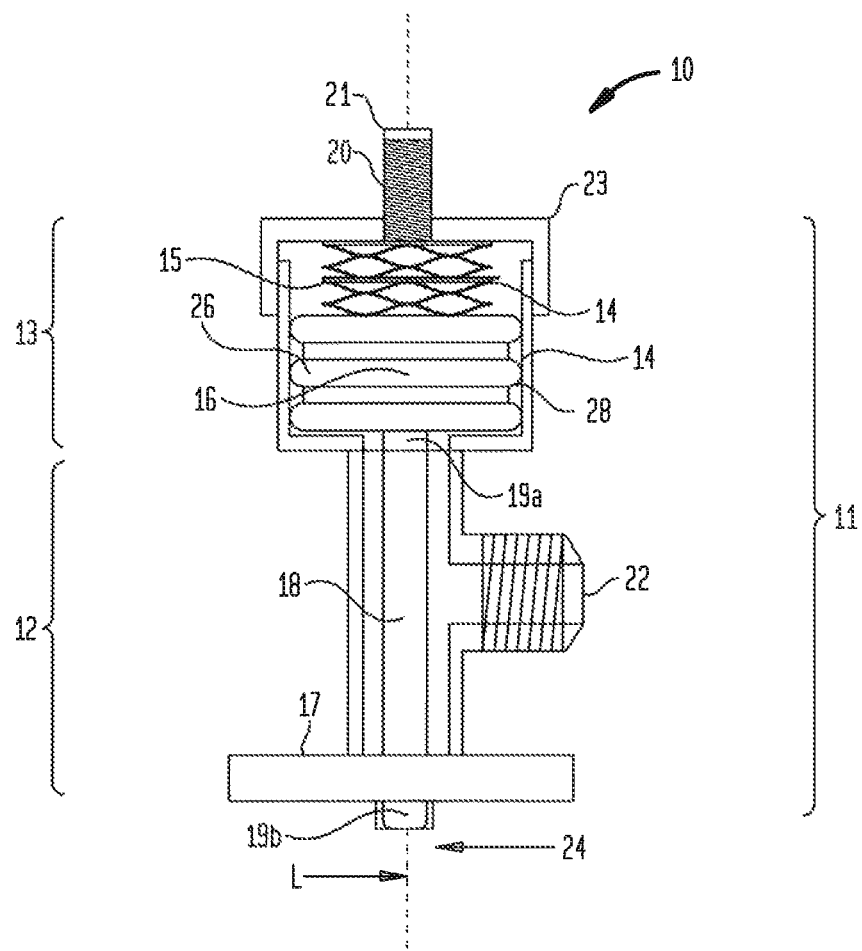
FIG. 1 is a cross-sectional view of an illustrative embodiment of the injection nozzle wherein the valve body outlet is in a closed position.

Before explaining the inventive embodiments in detail, it is to be understood that the present disclosure is not limited in its application to the details of construction and arrangement of parts illustrated in a particular embodiment, since the disclosure is capable of other embodiments and being practiced or carried out in various ways. Also, it is to be understood that the phraseology or terminology employed herein is for the purpose of description and not of limitation.

According to certain embodiments, the present disclosure relates to an injection nozzle for injecting a cryogenic substance, such as a cryogenic gas or cryogenic liquid, into the interior of a vessel, such as a cryogenic processing vessel, or directly into material, such as food products, located inside a vessel. The injection nozzle may be mounted to the exterior surface of a side wall of a cryogenic processing vessel to enable the injection nozzle to inject a cryogenic gas or liquid into the interior of the vessel. Conventional injection nozzles can be quickly replaced or substituted with the disclosed injection nozzle.

According to certain embodiments, the injection nozzle may be removably mountable to a cryogenic processing vessel, such as a blender or mixer. The blender or mixer receives food products, such as wet food products, for mixing and being subjected to further processing thereafter. The blender or mixer may include a sidewall which is constructed with a hole therein for providing fluid communication with substances at an interior of the blender or mixer. The food products frequently need to be chilled quickly, effectively and cost-efficiently. Chilling is done with a cryogen or a cryogenic substance from a source of for example gaseous or liquid carbon dioxide or liquid nitrogen (LIN).

According to certain embodiments, the injection nozzle comprises a housing having a first internal chamber for receiving a fluid and a second internal chamber having an actuator located therein. According to certain embodiments, the first internal chamber is detachable from the second internal chamber. In this manner, by way of illustration, and not limitation, the first internal chamber may have a snap fit engagement, a friction fit engagement and/or a threaded engagement with the second internal chamber. According to certain embodiments, the first internal chamber is formed integral with the second internal chamber, meaning that the first and second chambers are permanently affixed to each other. The first and second internal chambers can be manufactured as an integral part of the housing of the injection nozzle or as separate components.

According to certain embodiments, the first internal chamber has a substantially cylindrical shape and the second internal chamber has a substantially square or rectangular shape. It should be noted however that the first and second internal chambers may be configured in any shape so long as the chambers are capable of performing their intended function, as disclosed herein.

The injection nozzle housing and components thereof can be formed from a variety of materials. Suitable materials include, but are not limited to, stainless steel, aluminum, copper, copper-nickel alloys, and plastics such as ultra high molecular weight (UHMW) plastic or polytetrafluoroethylene (PTFE). According to certain embodiments, the injection nozzle may include a teflon sleeve.

According to certain embodiments, the injection nozzle comprises at least one inlet in fluid communication with the first internal chamber and configured to receive a gas and/or a liquid from a source.

According to certain embodiments, the injection nozzle comprises a valve body having an outlet. The valve body of the injection nozzle includes opposite facing first and second valve body sides or surfaces. The first valve body surface is in contact with the first internal chamber of the housing of the injection nozzle. The second valve body surface is configured to be removably mounted to the exterior side wall of a vessel, such as a cryogenic processing vessel.

According to certain embodiments, the valve body of the injection nozzle is substantially planar or completely planar. The valve body may be configured in any shape so long as the valve body is capable of engaging and supporting the housing of the injection nozzle and any additional structure(s) needed to removably mount the injection nozzle to the external surface of the side wall of a cryogenic processing or product treatment vessel during installation.

An outlet extends or passes through the entire thickness of the valve body and provides access to the first internal chamber of the housing of the injection nozzle. The outlet is configured to permit liquid and/or gas in the first internal chamber of the housing of the injector nozzle to flow therethrough and into the interior of a vessel. When liquid nitrogen is used as the cooling medium, the liquid nitrogen should be injected or deposited close to the substance being cooled to maximize cold transfer. According to certain embodiments, the valve body outlet of the injection nozzle is positioned below the substance level in the vessel, such as a blender or mixer. Such an arrangement allows the liquid cryogen injected from the valve body outlet of the injection nozzle to pierce or lance through the substance and circulate or move within the substance in the vessel for as long as possible, thereby maximizing heat transfer of the substance with the liquid cryogen.

The valve body outlet is configured to accept a stem for opening and closing the outlet. The valve body outlet may comprise a sealing member that releasably engages the stem. The sealing member may seal a gap between the outer diameter of the stem and the walls of the valve body outlet to prevent the flow of a liquid or gas therethrough. The seal may be any suitable seal formed from any suitable material for use with cryogenic fluids.

According to certain embodiments, the valve body includes at least one fastener opening that extends or passes through the entire thickness of the valve body. According to certain embodiments, the at least one fastener opening is configured to receive a fastener for removably attaching the valve body to the exterior side wall of a cryogenic processing vessel for the purpose of mounting the injection nozzle.

According to certain embodiments, the injection nozzle may be removably mounted to the exterior surface of a vessel side wall by a mechanical fastener that is inserted into the at least one fastener opening of the valve body. The injection nozzle may be bolted down to the exterior surface of the vessel by fastening nuts over threaded mechanical fasteners.

According to certain embodiments, the valve body of the injection nozzle includes a plurality of fastener openings. According to certain embodiments, the valve body of the injection nozzle includes six fastener openings. According to certain embodiments, the outlet is positioned substantially centrally on the valve body and six fastener openings are positioned concentrically about the outlet.

The injection nozzle includes a stem positioned within at least a portion of the first internal chamber of the housing. The stem has opposed proximal and distal ends and a longitudinal axis extending therebetween. The stem is reciprocally movable along the longitudinal axis of the housing to open and close the valve body outlet. According to certain embodiments, a distal portion of the stem is configured to extend distally along the entire length of the valve body outlet to close the outlet.

According to certain illustrative embodiments, the stem has a substantially cylindrical shape. It should be noted however that the stem may be configured in any shape so long as the stem is capable of effectively opening and closing the valve body outlet of the injection nozzle.

According to certain embodiments, the proximate end of the stem is in immediate adjacent contact with the actuator. In this manner, the actuator rests or otherwise sits on the proximal end of the stem. According to certain embodiments, the proximate end of the stem is affixed to at least a portion of the actuator. According to certain embodiments, the proximate end of the stem is not in immediate adjacent contact with the actuator but is configured to transmit a force to the actuator.

According to certain embodiments, the distal portion of the stem may extend within the valve body outlet thereby preventing fluid from flowing therethrough. According to certain embodiments, the distal portion of the stem extends distally along the valve body outlet until reaching a position that is substantially flush with the interior surface of a vessel. The distal portion of the stem may comprise a seal to prevent fluid from flowing through the valve body outlet when the distal portion of the stem is positioned therein.

The distal portion of the stem is configured to retract proximally along the longitudinal axis of the housing of the injection nozzle away from the valve body outlet, thereby opening the outlet. The distal portion of the stem is also configured to extend distally along the longitudinal axis of the housing into the valve body outlet, thereby closing the outlet.

The second internal chamber of the housing of the injection nozzle contains an actuator. According to certain embodiments, the actuator comprises a compression and expansion member. The compression and expansion member may comprise a biasing member such as for example a spring. According to certain embodiments, the spring comprises a compression spring. The compression spring may comprise an open-coil helical spring that provides resistance to a compressive force applied axially. The compression spring may be coiled at a constant diameter or may be coiled in other forms such as conical, concave (barrel), convex (hourglass), or combinations thereof. Other suitable types of springs may be used.

According to certain embodiments, the actuator comprises a compression and expansion member and a plunger. According to certain embodiments, the proximate end of the stem is in adjacent contact with the compression and expansion member and/or plunger. The plunger is reciprocally movable along the longitudinal axis of the second internal chamber of the housing.

According to certain embodiments, the actuator comprises a spring-loaded plunger. The spring and plunger components may be manufactured as a single integral part or as separate components. The plunger is configured to communicate on one side with the proximal end of the stem and on the other side with the spring.

According to certain embodiments, a plunger sealing member is seated within an annulus or groove of the plunger. The plunger sealing member may elastically conform to and fit within the annulus of the plunger. The plunger sealing member may be composed of an elastically deformable material, such as a fluoroelastomer. However, other materials may be used, for example, any suitable rubber or plastic. The plunger sealing member may be a molded one-piece member, although alternate designs contemplated by those skilled in the art are also possible. The plunger sealing member assists in preventing pressurized fluid within the first internal chamber of the housing from escaping into the second internal chamber of the housing. In this manner, the plunger sealing member maintains a seal with the interior side walls of the second internal chamber of the housing of the injection nozzle.

According to certain embodiments, the plunger comprises a sealing lip that provides a seal between the plunger and the interior side walls of the second internal chamber of the housing of the injection nozzle. The sealing lip prevents pressurized fluid within the first internal chamber of the housing from escaping into the second internal chamber of the housing. According to further embodiments, the plunger comprises a plurality of sealing lips.

In the absence of a pressurized fluid in the first internal chamber of the housing of the injection nozzle, the spring is configured to expand and to apply a force to the plunger which, in turn, applies a force to the proximal end of the stem thereby pushing and extending the distal end of the stem into the valve body outlet, thereby closing the outlet.

In the presence of a pressurized fluid in the first internal chamber of the housing of the injection nozzle, the plunger is configured to retract allowing the distal end of the stem in the first internal chamber of the housing to retract from the valve body outlet, thereby opening the outlet. In the retracted position, the plunger may also apply a force to the spring, thereby compressing the spring. A sensor may sense the expansion and compression of the spring and transmit a corresponding signal to an indicator member.

According to certain embodiments, the stem and at least a portion of the actuator are reciprocally movable along the longitudinal axis of the housing of the injection nozzle. According to certain embodiments, the stem and plunger are reciprocally movable along the longitudinal axis of the housing of the injection nozzle.

The injection nozzle includes a sensor configured to receive an input from the actuator. According to certain embodiments, at least a portion of the sensor is positioned in the second internal chamber of the housing of the injection nozzle. According to certain embodiments, the sensor is positioned on the exterior surface of the housing of the injection nozzle. According to certain embodiments, the sensor is positioned on the exterior surface of the second internal chamber of the housing of the injection nozzle. According to certain embodiments, the injection nozzle comprises a plurality of sensors. According to certain embodiments, the injection nozzle comprises at least two sensors.

The sensor may be configured to sense axial movement of the actuator and/or a given amount of pressure exerted by the actuator. According to certain embodiments, the sensor comprises a proximity sensor configured to sense a distance from the actuator. According to certain embodiments, the sensor comprises a pressure sensor. A suitable non-limiting pressure sensor is a micro-electro mechanical (MEMS) pressure sensor. Any and all other suitable sensors may be used.

According to certain embodiments, the sensor is configured to sense a signal from the actuator and transmit a corresponding signal to an indicator member and/or signal processing circuitry. According to certain embodiments, the sensor is configured to sense a signal from the actuator and transmit a signal corresponding to an open or closed position of the valve body outlet to an indicator member and/or signal processing circuitry.

The signal processing circuitry may include a controller, such as a programmable logic controller (PLC). The controller can also be, for example, a microprocessor, a field programmable gate array (FPGA) or an application-specific integrated circuit (ASIC). The controller may control any and all valves, indicator members or other components of the injection nozzle or the overall delivery apparatus. The controller may be configured to communicate with a user panel, such as a human-machine interface (HMI).

According to certain embodiments, the injection nozzle comprises an indicator member. According to certain embodiments, the injection nozzle comprises a plurality of indicator members. The sensor is configured to transmit a signal corresponding to an open or closed position of the valve body outlet directly to the indicator member and/or to signal processing circuitry which transmits a signal to the indicator member. By way of illustration, and not limitation, the indicator member may comprise a visually perceptible output. The visually perceptible output may comprise a light output, such as an LED display. According to certain embodiments, the visually perceptible output is configured to selectively display a color corresponding to an open or closed position of the valve body outlet. According to certain embodiments, the visually perceptible output displays a red color when the valve body outlet is in a closed position, and displays a green light when the valve body outlet is in an open position.

According to certain embodiments, the injection nozzle comprises an access means or a cover to the second internal chamber of the housing. The access means or the cover permits the second internal chamber, and components therein, to be easily accessed for maintenance, repair and cleaning. According to certain embodiments, the second internal chamber of the housing of the injection nozzle comprises a distal opening. The injection nozzle may comprise a closure member removably engaged to the distal opening of the second internal chamber of the housing. In this manner, the closure member may be engaged around an outer surface of the distal opening of the second internal chamber of the housing. The closure member may be removed from the second internal chamber of the housing to provide access to the second internal chamber and components therein.

Also disclosed is a method for determining whether an injection nozzle outlet is in an open or closed position comprising removably attaching an injection nozzle to an exterior surface of a vessel, performing injection cycles with the injection nozzle, and viewing an indicator member that is in communication with the injection nozzle. The injection nozzle has a housing having a first internal chamber for receiving a gas and/or a liquid and a second internal chamber having an actuator located therein, a valve body having an outlet, and a stem positioned within the first internal chamber of the housing and having opposed proximal and distal ends. The stem is reciprocally movable along its longitudinal axis of the housing to open and close the valve body outlet. A sensor is configured to receive a signal from the actuator and is configured to transmit a signal corresponding to an open or closed position of the valve body outlet directly to an indicator member and/or to signal processing circuitry which transmits a signal to the indicator member.

Also disclosed is an apparatus for delivering a cryogen comprising: a source of cryogen; a manifold; a conduit connecting the source of cryogen to the manifold; a plurality of injection nozzles in fluid communication with the manifold; a cryogenic process vessel in fluid communication with the plurality of injection nozzles; signal processing circuitry; and an indicator member. Each of the plurality of the injection nozzles comprise a housing having a first internal chamber for receiving a gas and/or a liquid and a second internal chamber having an actuator located therein, a valve body having an outlet, and a stem positioned within the first internal chamber of the housing and having opposed proximal and distal ends. The stem is reciprocally movable along its longitudinal axis of the housing to open and close valve body outlet. A sensor is configured to receive a signal from the actuator and to transmit a signal to the signal processing circuitry and/or the indicator member.

According to certain embodiments, the cryogen delivery apparatus further includes a secondary valve on the manifold. The secondary valve on the manifold may be configured to automatically close in the event that an injection cycle is shut down, but the indicator member indicates that the valve body outlet on at least one injection nozzle is in an open position.

Before commencement of an injection cycle, it is confirmed that the indicator member indicates that the valve body outlet on each injection nozzle is in a closed position. For example, the indicator member may display a red light to indicate that the valve body outlet on each injection nozzle is in a closed position. Once it is confirmed that the valve body outlet on each injection nozzle is in a closed position, the injection cycle is commenced, and pressurized fluid is permitted to flow within the first internal chamber of the housing of the injection nozzle. The pressurized fluid applies a force to the actuator (e.g., a plunger component of the actuator) thereby retracting the plunger which, in turn, retracts the distal end of the stem away from the valve body outlet, thereby opening the outlet. In response to the applied force, the actuator transmits a signal to the sensor which, in turn, transmits a signal directly to an indicator member and/or signal processing circuitry indicating that the outlet on each injection nozzle is in the open position or, alternatively, that the outlet on one or more injection nozzles is in a closed position, thereby indicating a malfunction of the one or more injection nozzles.

At the end of an injection cycle, pressurized fluid is prevented from flowing within the first internal chamber of the housing of the injection nozzle. The absence of pressurized fluid allows at least a portion of the actuator to extend which, in turn, pushes and extends the distal end of the stem back into the valve body outlet, thereby closing the outlet. The actuator transmits a signal to the sensor which, in turn, transmits a signal directly to an indicator member and/or signal processing circuitry indicating that the outlet of each injection nozzle is in the closed position or, alternatively, that the outlet on one or more injection nozzles is still in the open position, thereby indicating a malfunction of the one or more injection nozzles. A secondary valve on a manifold or elsewhere on the cryogenic cooling apparatus can be configured to automatically close in the event that the injection cycle is shut down or turned off, but the indicator member indicates that an outlet on an injection nozzle is in an open position.

Without limitation, and only by way of illustration, the injection nozzle may be mounted to the exterior surface of a side wall of cryogenic blenders, cryogenic tumblers, cryogenic mixers, cryogenic kettles, cryogenic chillers, cryogenic coolers, cryogenic freezers and other cryogenic processing vessels that are used to cryogenically process product.

According to certain illustrative embodiments, the injection nozzle may be mounted to the exterior surface of a side wall of cryogenic blenders, cryogenic tumblers, cryogenic mixers and cryogenic kettles to cryogenically process, for example, food and beverage products in the food and beverage industry. Without limitation and only by way of illustration, the cryogenic processing vessel may be used to cryogenically process baby food, dairy products, dry foods, bakery products, fish, seafood, fruits, vegetables, meats, meat analogues, meat alternatives, fake meats, faux meats, imitation meats, mock meats, meat substitutes, vegetarian meats, vegan meats, pastes, pulp products, purees, sauces, soups, and like food and beverage products.

According to certain illustrative embodiments, the injection nozzle may comprise an injection nozzle that is configured to inject a defined amount of cryogen near the bottom of the cryogen processing vessel. These cryogenic processing vessels are referred to as bottom injection (BI) cooling or chilling apparatus.

The injection nozzle may comprise an injection nozzle that is configured to inject a defined amount of cryogen directly into the product mass within the cryogen processing vessel. The cryogenic fluid evaporates or sublimes in contact with the product mass, absorbing heat from it, and the cold cryogenic gas continues to cool the product as it moves through the cryogenic process vessel.

The cryogenic processing apparatus includes a cryogenic material processing chamber, vessel or vessel, a plurality of cryogen injection nozzles, storage vessel or storage vessel for storing a source of cryogen to be delivered to the cryogen processing vessel, suitable hosing, piping or tubing for connecting the cryogen injection nozzles to the source of cryogen fluid, and a controller for controlling the apparatus and cryogenic cooling process.

Cryogenic fluids are cooling or chilling fluids that are liquids at or below a temperature of about −150° C. Suitable cryogenic fluids that may be delivered to the cryogenic treatment vessel by the cryogen injection nozzle include, for example, but are not limited to liquid argon, liquid carbon dioxide, liquid helium, liquid nitrogen, and the like. According to certain embodiments, the cryogenic fluid is liquid nitrogen. According to other embodiments, the cryogenic fluid is liquid carbon dioxide. The cryogenic cooling or chilling of the material within the cryogen treatment vessel with the cryogenic fluid can be carried out at any cryogenic temperatures that are suitable to sufficiently chill or cool the material for subsequent processing. By way of illustration, and not limitation, the cryogenic cooling or chilling of the material located within the cryogenic treatment vessel with the cryogenic fluid can be carried out at temperatures at or below −150° C., at or below −160° C., at or below −170° C., at or below −180° C., at or below −190° C., at or below −200° C., or at lower temperatures.

Referring to FIG. 1, the injection nozzle 10 includes housing 11 having a first internal chamber 12 for receiving a gas and/or a liquid, and a second internal chamber 13 having an actuator 14 located therein. The actuator 14 includes a spring-loaded plunger 16. A plunger sealing member 26 is positioned or seated within an annulus 28 or groove of the plunger 16. A spring 15 for the plunger 16 may be in adjacent contact with the plunger. The injection nozzle 10 also includes a valve body 17 having an outlet 24. The injection nozzle 10 further includes a stem 18 positioned within the first internal chamber 12 of the housing 11 and having opposed proximal 19a and distal 19b ends. The stem 18 is reciprocally movable along its longitudinal axis L of the housing 11 to open and close valve body outlet 24. According to FIG. 1, the distal end 19b of the stem 18 is in an extended position within the valve body outlet 24, thereby closing the outlet 24. The injection nozzle 10 further includes a sensor 20 configured to receive a signal from the actuator 14, and an indicator member 21 in communication with the sensor 20 and configured to have or generate an output. The injection nozzle 10 also includes an inlet 22 in fluid communication with the first internal chamber 12 and configured to receive gas and/or liquid from a source (not shown). The sensor 20 is configured to transmit a signal corresponding to a closed position of the valve body outlet 24 to the indicator member 21 and/or signal processing circuitry (not shown). The indicator member 21 may be a visually perceptible output, such as an LED light display, such display being continuous or flashing. The injection nozzle 10 also includes a closure member 23 or a cover (access means) removably engaged to an opening of the second internal chamber 13.

Figure 2:
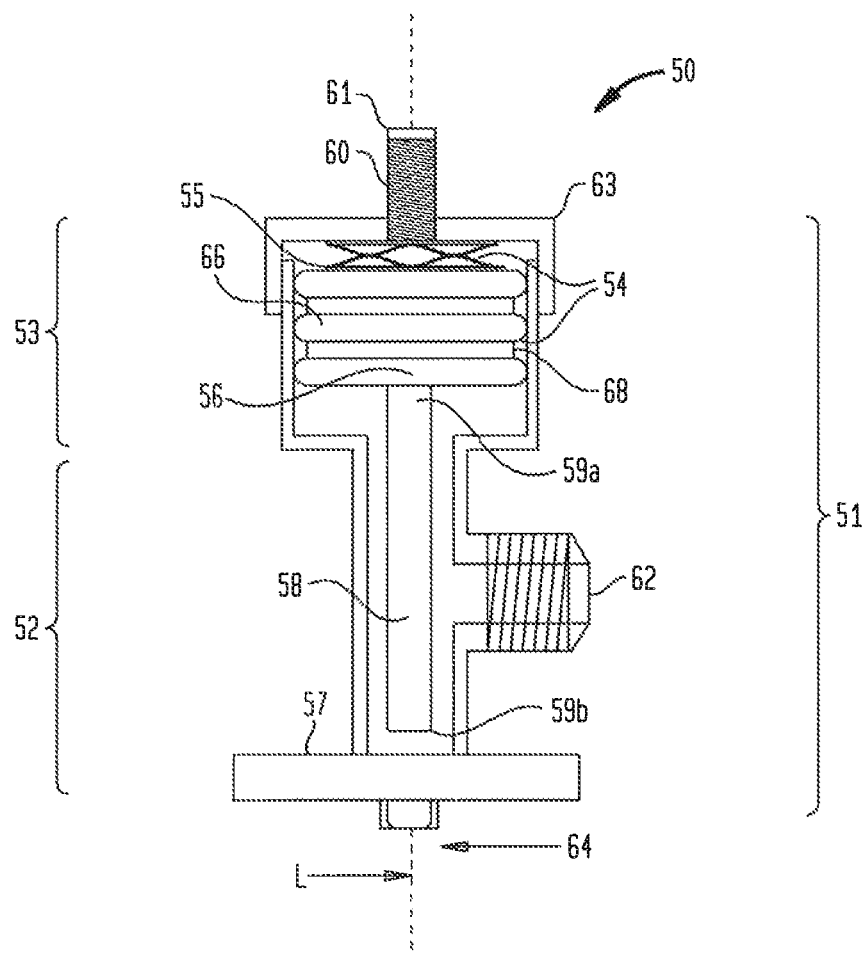
FIG. 2 is a cross-sectional view of an illustrative embodiment of the injection nozzle wherein the valve body outlet is in an open position.
Figure 3:
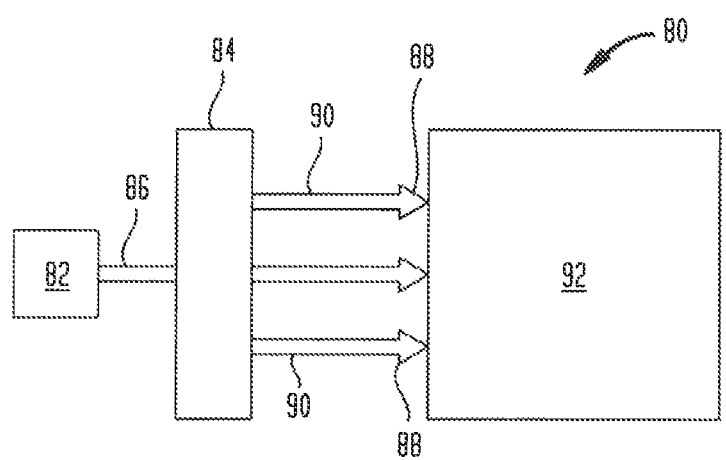

Referring to FIG. 2, an injection nozzle 50 includes housing 51 having a first internal chamber 52 for receiving a gas and/or a liquid, and a second internal chamber 53 having an actuator 54 located therein. The actuator 54 includes a spring-loaded plunger 56. A plunger sealing member 66 is positioned or seated within an annulus 68 or groove of the plunger 56. A spring 55 for the plunger 56 may be in adjacent contact with the plunger. The injection nozzle 50 also includes a valve body 57 having an outlet 64. The injection nozzle 50 further includes a stem 58 positioned within the first internal chamber 52 of the housing 51 and having opposed proximal 59a and distal 59b ends. The stem 58 is reciprocally movable along its longitudinal axis L of the housing 51 to open and close valve body outlet 64.

According to FIG. 2, the distal end 59b of the stem 58 is in a retracted positioned away from the valve body outlet 64, thereby opening the outlet 64. The injection nozzle 50 further includes a sensor 60 configured to receive a signal from the actuator 54, and indicator member 61 in communication with the sensor 60 and configured to have or generate an output. The injection nozzle 50 also includes an inlet 62 in fluid communication with the first internal chamber 52 and configured to receive gas and/or liquid from a source (not shown). The sensor 60 is configured to transmit a signal corresponding to an open position of the valve body outlet 64 to the indicator member 61 and/or signal processing circuitry (not shown). The indicator member 61 may be a visually perceptible output, such as an LED light display, such display being continuous or flashing. The injection nozzle 50 also includes a closure member 63 or cover (access means) removably engaged to an opening of the second internal chamber 53.

Illustrative embodiments of the injection nozzle and apparatus and methods regarding same include:

In a first embodiment, provided is an injection nozzle comprising: a housing having a first internal chamber for receiving a fluid (gas and/or a liquid) and a second internal chamber having an actuator located therein; a valve body having an outlet; a stem positioned within the first internal chamber of the housing and having opposed proximal and distal ends, the proximal end adapted to contact the actuator, and wherein the stem is reciprocally movable along its longitudinal axis in the housing to open and close the valve body outlet; and a sensor configured to receive a signal from the actuator.

According to a second embodiment, provided is an injection nozzle of the first embodiment further comprising an indicator member in communication with the sensor and configured to have or generate an output indicative of a status of the valve body outlet.

According to a third embodiment, provided is an injection nozzle of embodiment 1 or embodiment 2 further comprising an inlet in fluid communication with the first internal chamber and configured to receive the fluid.

According to a fourth embodiment, provided is an injection nozzle of embodiment 1 or any subsequent embodiments, wherein the sensor is configured to transmit a signal corresponding to the status of the valve body outlet to the indicator member.

According to a fifth embodiment, provided is an injection nozzle of embodiment 4, wherein the output of the indicator member comprises a visually perceptible output.

According to a sixth embodiment, provided is an injection nozzle of embodiment 1 or any subsequent embodiments, wherein the visually perceptible output selectively displays a color selected from the group consisting of a first color corresponding to an open position of the valve body outlet, and a second color corresponding to a closed position of the valve body outlet.

According to a seventh embodiment, provided is an injection nozzle of embodiment 1 or any subsequent embodiments, wherein the sensor comprises a proximity sensor.

According to an eighth embodiment, provided is an injection nozzle of embodiment 1 or any subsequent embodiments, wherein the sensor comprises a pressure sensor.

According to a ninth embodiment, provided is an injection nozzle of embodiment 1 or any subsequent embodiments, wherein the fluid (gas and/or the liquid) comprises cryogen; and the cryogen may be selected from the group consisting of cryogenic gas, and cryogenic liquid.

According to a tenth embodiment, provided is an injection nozzle of embodiment 1 or any subsequent embodiments, wherein the proximal end of the stem is configured to transmit a force to the actuator.

According to an eleventh embodiment, provided is an injection nozzle of embodiment 10, wherein the proximal end of the stem is in adjacent contact with the actuator.

According to a twelfth embodiment, provided is an injection nozzle of embodiment 1 or any subsequent embodiments, wherein the actuator comprises a compression and expansion member.

According to a thirteenth embodiment, provided is an injection nozzle of embodiment 12, wherein the compression and expansion member comprises a compression spring.

According to a fourteenth embodiment, provided is an injection nozzle of embodiment 1 or any subsequent embodiments, wherein the actuator comprises a spring-loaded plunger.

According to a fifteenth embodiment, provided is an injection nozzle of embodiment 14, wherein the spring-loaded plunger comprises plunger sealing member seated within an annulus or groove of the plunger.

According to a sixteenth embodiment, provided is an injection nozzle of embodiment 1 or any subsequent embodiments, wherein the second internal chamber of the housing comprises a removably mountable cover for access to the second internal chamber.

According to a seventeenth embodiment, provided is an injection nozzle of embodiment 16 further comprising a closure member removably engaged to the access means of the second internal chamber of the housing.

According to an eighteenth embodiment, provided is a method for determining whether an outlet on the injection nozzle of embodiment 1 or any subsequent embodiments is in an open or closed position.

According to a nineteenth embodiment, provided is an apparatus 80 for delivering a cryogen comprising: a source of cryogen 82; a manifold 84; a conduit 86 connecting the source of cryogen to the manifold; a plurality of injection nozzles 88 according to claim 1 in fluid communication 90 with the manifold; a cryogenic process vessel 92 in fluid communication with the plurality of injection nozzles; signal processing circuitry; and an indicator member, wherein the sensor of the injection nozzles is configured to transmit a signal corresponding to an open or closed position of the valve body outlet of the injection nozzles directly to the indicator member and/or to signal processing circuitry which transmits a signal to the indicator member.

According to a twentieth embodiment, provided is an apparatus for delivering a cryogen of embodiment 19, wherein the signal processing circuitry comprises a programmable logic controller (PLC).

According to a twenty-first embodiment, provided is an apparatus for delivering a cryogen of embodiment 19 or 20 further comprising a secondary valve on the manifold, wherein the secondary valve is configured to close when the apparatus is shut down but the indicator member indicates that the valve body outlet is in the open position.

It will be understood that the embodiments described herein are merely exemplary, and that one skilled in the art may make variations and modifications without departing from the spirit and scope of the invention. All such variations and modifications are intended to be included within the scope of the invention as described and claimed herein.

Further, all embodiments disclosed are not necessarily in the alternative, as various embodiments of the invention may be combined to provide the desired result.

What is claimed is:

1. An injection nozzle, comprising: a housing having a first internal chamber for receiving a fluid selected from a group consisting of a cryogenic gas, and cryogenic liquid, and a second internal chamber having an actuator located therein; a valve body having an outlet; a stem positioned within the first internal chamber of the housing and having opposed proximal and distal ends, the proximal end adapted to contact the actuator, and wherein the stem is reciprocally movable along a longitudinal axis in the housing to open and close the valve body outlet; and a sensor configured to receive a signal from the actuator.

2. The injection nozzle of claim 1, further comprising an indicator member in communication with the sensor and configured to have an output indicative of a status of the valve body outlet.

3. The injection nozzle of claim 2, wherein the sensor is configured to transmit a signal corresponding to the status of the valve body outlet to the indicator member.

4. The injection nozzle of claim 3, wherein the output of the indicator member comprises a visually perceptible output.

5. The injection nozzle of claim 4, wherein the visually perceptible output selectively displays a color selected from the group consisting of a first color corresponding to an open position of the valve body outlet, and a second color corresponding to a closed position of the valve body outlet.

6. The injection nozzle of claim 1, further comprising an inlet in fluid communication with the first internal chamber and configured to receive the fluid.

7. The injection nozzle of claim 1, wherein the sensor is selected from the group consisting of a proximity sensor, and a pressure sensor.

8. The injection nozzle of claim 1, wherein the proximal end of the stem is configured to transmit a force to the actuator.

9. The injection nozzle of claim 8, wherein the proximal end of the stem is in adjacent contact with the actuator.

10. The injection nozzle of claim 1, wherein the actuator comprises a compression and expansion member.

11. The injection nozzle of claim 10, wherein the compression and expansion member comprises a compression spring.

12. The injection nozzle of claim 1, wherein the actuator comprises a spring-loaded plunger.

13. The injection nozzle of claim 12, wherein the spring-loaded plunger comprises a groove and a plunger sealing member seated within the groove of the plunger.

14. The injection nozzle of claim 1, wherein the second internal chamber of the housing comprises a removably mountable cover for access to the second internal chamber.

15. An apparatus for delivering a cryogen comprising: a source of cryogen; a manifold; a conduit connecting the source of cryogen to the manifold; a plurality of injection nozzles, each one of which is in fluid communication with the manifold and includes a housing having a first internal chamber for receiving a fluid selected from a group consisting of a cryogenic gas and a cryogenic liquid, and a second internal chamber having an actuator located therein, a valve body having an outlet a stem positioned within the first internal chamber of the housing and having opposed proximal and distal ends, the proximal end adapted to contact the actuator, and wherein the stem is reciprocally movable along a longitudinal axis in the housing to open and close the valve body outlet, and a sensor configured to receive a signal from the actuator; a cryogenic process vessel in fluid communication with the plurality of injection nozzles; and an indicator member, wherein the sensor of each one of the injection nozzles is configured to transmit a signal corresponding to an open or closed position of the valve body outlet of each one of the injection nozzles directly to the indicator member.

* * * * *